United States Patent [19]

Uchidoi et al.

[11] 4,236,802
[45] Dec. 2, 1980

[54] SAFETY DEVICE FOR CAMERA

[75] Inventors: Masanori Uchidoi, Yokohama; Masaharu Kawamura, Kawasaki; Yoshihiro Shigeta, Tokyo; Yoji Sugiura; Hiroshi Yamamoto, both of Yokohama; Nobuo Tezuka, Tokyo, all of Japan

[73] Assignee: Canon Kabushiki Kaisha, Tokyo, Japan

[21] Appl. No.: 70,800

[22] Filed: Aug. 29, 1979

[30] Foreign Application Priority Data

Sep. 14, 1978 [JP] Japan .............................. 53-113047

[51] Int. Cl.³ .................... G03B 17/38; G03B 17/18
[52] U.S. Cl. .................................... 354/268; 354/289
[58] Field of Search ..................... 354/23 D, 234, 235, 354/267, 266, 268, 289, 258, 60 R, 60 C, 60 L

[56] References Cited

U.S. PATENT DOCUMENTS

| | | | |
|---|---|---|---|
| 3,628,437 | 12/1971 | Fahlenberg | 354/258 |
| 4,001,843 | 1/1977 | Ellin | 354/23 D |
| 4,181,417 | 1/1980 | Sugiura et al. | 354/268 |

Primary Examiner—Michael L. Gellner
Assistant Examiner—William B. Perkey
Attorney, Agent, or Firm—Toren, McGeady and Stanger

[57] ABSTRACT

A safety device for preventing non exposure of film in a camera having a count switch which is normally closed prior to shutter release operation, the switch being opened after the shutter release operation begins to enable a timing circuit to start operating. In a preferred embodiment, the device includes a NOR gate having an input connected to one side of the count switch, and its output connected to the set terminal of a flip-flop which enables the shutter release operation. Another input of the NOR gate is connected to a differentiation circuit which provides an output signal when the shutter release button on the camera is actuated. This circuit arrangement operates so that the flip-flop is not set if the count switch is accidently in an open state when the release button is actuated. The shutter release operation is thereby prevented until the count switch is restored to working order.

12 Claims, 1 Drawing Figure

SAFETY DEVICE FOR CAMERA

BACKGROUND OF THE INVENTION

1. Field of the Invention

The present invention relates to a safety device particularly for avoiding a misoperation due to the abnormal state of the count switch.

2. Description of the Prior Art

Generally, a time constant circuit having a condenser is used as a timing circuit for the electronic shutter of a camera. In case of such a timing circuit it is well known that the count switch connected parallel to the condenser has to be closed before the shutter opening.

However, the count switch consists of mechanical contacts so that the count switch often assumes the opened state due to inferior contact or broken wiring before th shutter opening.

Under such circumstances, in case of a camera equipped with such a timing circuit, no proper exposure time cannot be obtained and no exposure to the film is made.

SUMMARY OF THE INVENTION

A purpose of the present invention is to offer a safety device for a camera capable of avoiding the above mentioned misoperation in advance.

Another purpose of the present invention is to offer a safety device for a camera capable of displaying the above mentioned misoperation.

Further, another purpose of the present invention is to offer a safety device for a camera capable of displaying the above mentioned misoperation at the time of shutter release.

Further, another purpose of the present invention is to offer a safety device simple in construction for a camera which is capable of avoiding the above mentioned misoperation in advance.

BRIEF DESCRIPTION OF THE DRAWINGS

The drawing shows an embodiment of the exposure control circuit for a single lens reflex camera in which the safety device in accordance with the present invention is applied.

DESCRIPTION OF THE PREFERRED EMBODIMENT

Figure 1:
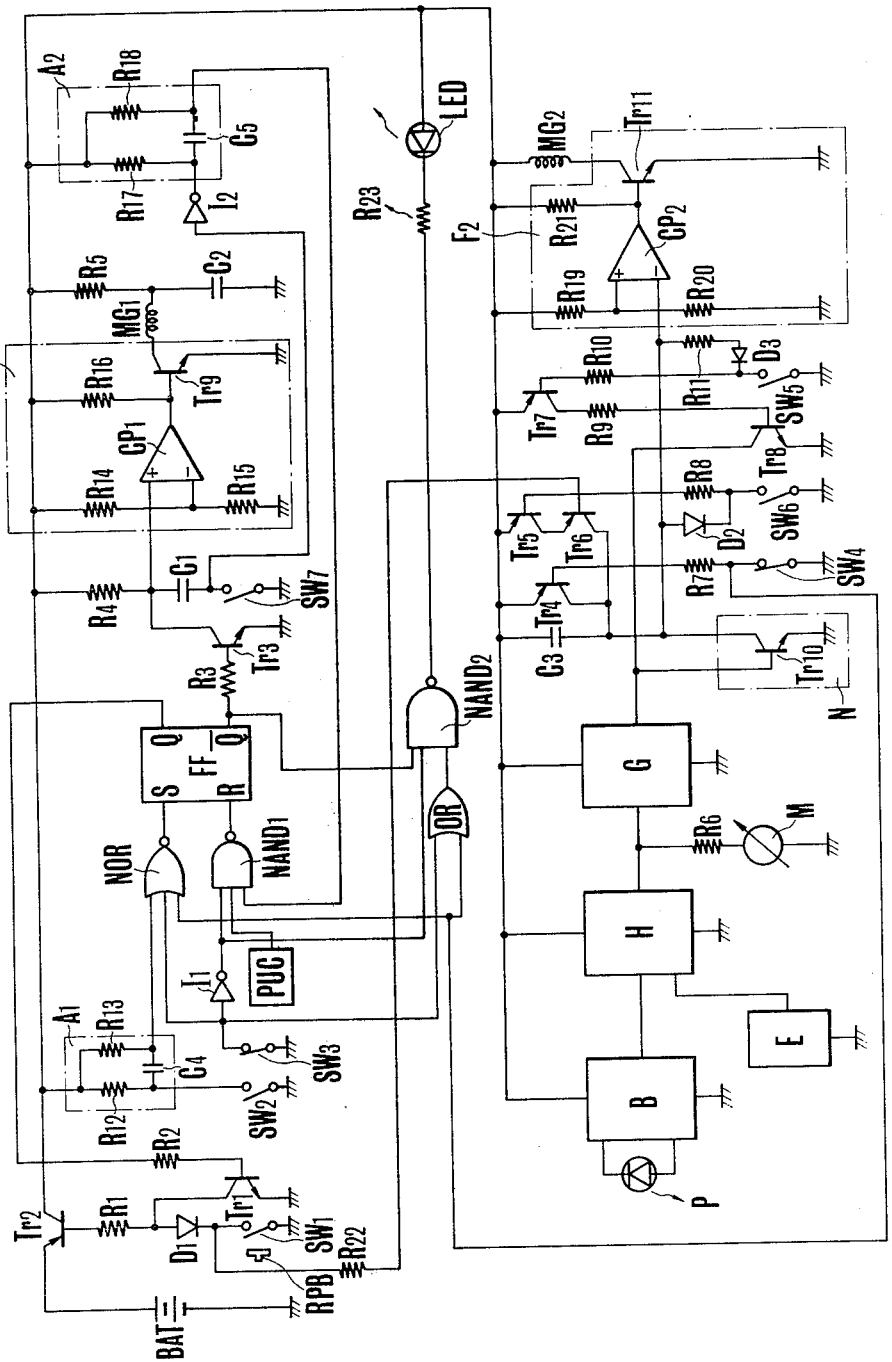

The drawing shows an embodiment of the exposure control circuit for a single lens reflex camera in which the safety device in accordance with the present invention is applied. In the drawing BAT is the power source, Tr2 is the power supply transistor for controlling the power supply to the exposure control circuit, and SW1 is the light measuring switch to be closed with the first stroke of a shutter releast button RPB. The light measuring switch SW1 is connected to the base of the above transistor Tr2 through the resistance R1 and the diode D1 in such a manner that the transistor Tr2 is brought into the closed state when the switch SW1 is closed. Symbol A1 represents a differentiating circuit consisting of resistances R12 and R13 and a condenser C4. The circuit A1 is connected to the release switch SW2 which is closed upon a second or full stroke of the release button RPB. When the switch SW2 is closed, the differentiating circuit A1 is actuated so as to produce a differentiation pulse. SW3 is the winding-up completion detection switch to be closed in the winding-up completion state and opened when a trailing curtain has completed its movement or run. NOR is a NOR gate, while FF is a flip-flop, whose set terminal S is connected to the output terminal of the NOR gate NOR. The input terminal of the NOR gate NOR is connected to the output terminal of the switches SW3 and SW4 and the differentiating circuit A1 so as to transfer the differentiation pulse from the differentiating circuit A1 to the set terminal S of the flip-flop FF. NAND1 is a NAND gate whose output terminal is connected to the reset terminal R of the flip-flop FF. The input terminal of the NAND gate NAND1 is connected to the output terminal of inverter I1, the power-up clear circuit PUC and the differentiating circuit A2 to be explained later. The power-up clear circuit PUC produces a low level pulse when the transistor Tr2 is brought into the closed state and current is supplied to the circuits. Tr1 is the power supply maintaining transistor connected parallel with the switch SW1, whereby the base of the transistor Tr1 is connected to the output terminal Q of the flip-flop FF through the resistance R2. R4 is a resistance, C1 is a condenser for self-timer operation and SW7 is the switch for self-timer. The switch SW7 is closed when the self-timer mode has been selected by means of a mode setting dial not shown in the drawing. Tr3 is a transistor whose base is connected to the output terminal $\bar{Q}$ of flip-flop FF through the resistance R3. F1 is a level detector consisting of resistances R14–R16, a comparator CP1 and a transistor Tr9. MG1 is a release magnet connected to the collector of the transistor Tr9. The magnet MG1 is brought into the excited state when the transistor Tr9 has been brought into the closed state, so as to actuate the release member of the camera, not shown in the drawing, in order to carry out the release operation. I2 is an inverter and A2 is a differentiating circuit consisting of resistances R17 and R18 and a condenser C5. The differentiating circuit A2 produces a differentiation pulse when the switch SW7 has been brought out of the closed state into the opened state, in such a manner that the NAND gate NAND1 produces a high level signal. P is a light sensing element such as silicon photo cell, B is a conventional light measuring circuit for logarithmically compressing the output of the light sensing element P, E is the exposure information signal forming circuit for producing exposure information signals such as film sensitivity information, preset aperture value information and so on, H is a conventional calculation circuit for calculating the output (Tv signal) of the light measuring circuit B and the exposure information signal forming circuit E, M is a display meter for displaying the output of the calculation circuit and G is a conventional memory circuit for storing the output of the calculation circuit. N is a logarithmically enlarging circuit for enlarging the shutter time signal (Tv signal) which is the output of the memory circuit G. The circuit N consists of a transistor Tr10. C3 is a shutter time determining condenser connected to the collector of the transistor Tr10, Tr4 is a transistor connected parallel to the condenser C3 and SW4 is a count switch to be closed when the winding-up has been completed and opened when the leading shutter curtain has started to run. The base of the transistor Tr4 is connected to the switch SW4 through the resistance R7 in such a manner that the transistor Tr4 is brought into the opened state when the switch SW4 has been opened so as to start a charging of the condenser C3. SW6 is the bulb switch.

The switch SW6 is operatively engaged with a mode setting dial, not shown in the drawing, so as to be closed when the bulb photographing mode has been selected by means of the dial. Tr5 and Tr6 are transistors connected in series with each other, whereby the base of the transistor Tr5 is connected to the switch SW6 through the resistance R8. The transistor Tr5 is brought into the closed state when the switch SW6 is closed. Further, the base of the transistor Tr6 is connected to the switch SW1 through the resistance R22 in such a manner that the transistor Tr6 is brought into the closed state when the switch SW1 has been closed. These transistors Tr5 and Tr6 serve as a switch for short circuiting the condenser C3 at the time of bulb photographing. D2 is a diode, SW5 is a flash light photographing switch and R11 is the flash light timing resistance. The resistance R11 has a value corresponding to, for example, 1/60 sec. so as to form a time constant circuit for the flash light timing together with the condenser C3 when the switch SW5 is closed. The switch SW5 is operatively engaged with the mode setting dial so as to be closed when the flash light photographing mode has been selected with the dial. Tr7 and Tr8 are transistors, D3 is a diode, R9 and R10 are resistances and F2 is a level detector for detecting the charge voltage of the condenser C3. The level detector consists of resistances R19, R20 and R21, a comparator CP2 and a transistor Tr11. MG2 is the trailing shutter curtain holding magnet, whereby when the magnet is brought into the non-excited state the trailing shutter curtain, not shown in the drawing, is released so as to start to run. OR is an OR gate whose one input terminal is connected to the switch SW3 and whose other input terminal is connected to the switch SW4. NAND2 is a NAND gate, one input terminal being connected to the output terminal of the inverter I1, another input terminal being connected to the output terminal of the OR gate, and a third input terminal being connected to the output terminal $\bar{Q}$ of the flip-flop FF. R23 is a resistance and LED is a light emitting diode. The gates OR and NAND2, the resistance and LED constitute an abnormality detection and display circuit for the count switch SW4.

Below, the operation of the erroneous operation preventing circuit in accordance with the present invention will be explained in accordance with the figure.

Firstly, the case when the count switch SW4 is always in the opened state due to inferior connection or wiring will be explained.

Now let us suppose that the camera is in the wound-up state so that the switch SW3 is closed, that the automatic photographing mode has been selected by means of the mode dial, not shown in the drawing and the switches SW5–SW7 are opened. In this state, when the release button, not shown in the drawing, is operated the switch SW1 is closed with the first stroke or movement of the button. Thus, the transistor Tr2 is closed so that the respective circuits assume a state in which they are supplied with current. Further, the transistor Tr2 has been closed so as to actuate the power-up clear circuit PUC to produce a low level pulse to be transferred to the NAND gate NAND1. On the other hand, the switch SW3 remains closed, the inverter I1 is producing a high level signal, the switch SW7 remains opened and the inverter I2 is producing a low level signal. Thus, the differentiating circuit A2 is producing a high level signal so that the NAND gate NAND1 transfers the low level pulse from the power-up clear circuit PUC to the reset terminal R of the flip-flop FF as a high level pulse. Consequently, the flip-flop FF is reset by means of the low level pulse from the power-up clear circuit in such a manner that the Q output delivers a low level signal while the $\bar{Q}$ output delivers a high level signal. When then the release button RPB is further pushed down so as to carry out a second stroke or movement, the switch SW2 is closed. Thus, the differentiating circuit A1 is actuated so as to transfer a low level differentiation pulse to the NOR gate NOR.

On the other hand, the switch SW3 is closed so as to produce a low level signal so that normally a high level signal would be produced from the NOR gate NOR with a low level pulse of the differentiating circuit A1 so as to set the flip-flop FF. However, as mentioned above, the count switch SW4 is opened so that the switch SW4 is producing a high level signal. Thus, the NOR gate NOR does not respond to the differentiation pulse from the differentiating circuit A1 so as to continue producing a low level signal, keeping the flip-flop FF in the reset state. Thus, in this case, even if the release operation is carried out the Q output terminal of the flip-flop FF continues producing a low level signal so as to maintain the transistor Tr1 in the opened state. Further, as mentioned above, the flip-flop FF is in the reset state so that the $\bar{Q}$ output terminal continues producing a high level signal so as to maintain the transistor Tr3 in the closed state. Consequently, even if the release operation is carried out low level signals are being applied to the positive input terminal of the comparator CP1, so that the comparator CP1 is not inverted so as to continue producing low level signals. Consequently, even if the release operation is carried out, the transistor Tr9 remains in the opened state, as mentioned above, so as to maintain the magnet MG1 in the non-excited state. Consequently, the release member does not carry out the release operation so that the photographing operation is not carried out. At this time, the light emitting diode LED is lit up so as to display that the count switch SW4 is abnormal. Namely, in this case, the switch SW4 is opened and a high level signal is applied to the first input terminal of the NAND gate NAND2 through the OR gate OR. Further, because the switch SW3 is closed, the inverter I1 produces a high level signal to be delivered to the second input terminal of the NAND gate NAND2. Further, the $\bar{Q}$ output terminal of the flip-flop FF produces a high level output to be delivered to the third input terminal of the NAND2. Consequently, the NAND gate NAND2 delivers a low level signal at the time at which the gate is brought into the state in which it is supplied with a current with the first release stroke. Thus, the light emitting diode LED is immediately lit up with the first stroke of the release button so as to display that the count switch SW4 is abnormal.

As explained above, in accordance with the present invention the photographing operation is automatically suspended in case the count switch is opened due to inferior contact or wiring, so that the conventional shortcomings such that at the same time with the release operation the leading and the trailing shutter curtain start to run so as to cause non-exposure can be eliminated. Namely, in the case of the conventional release member of a camera, when the count switch SW4 is opened before the start of the release operation, the transistor Tr4 is also in the opened state so that the short-circuit of the condenser C3 is released before the start of the leading shutter curtain, so that the condenser C3 is charged before the start of the leading shutter curtain in such a manner that the output of the condenser C3 reaches a certain determined potential. Consequently, the comparator CP2 delivers a low level signal before the start of the leading shutter curtain so as to bring the transistor Tr11 in the opened state, whereby the magnet MG2 is brought into the non-excited state in such a manner that the holding of the trailing shutter curtain is released before the start of the leading shutter curtain. Thus, when the leading shutter curtain starts to run with the second stroke of the release button, the trailing shutter curtain starts to run at the same time. Thus, the film remains unexposed. However, in accordance with the present invention, the photographing operation is prohibited in case the count switch is abnormal so that the above mentioned non-exposure of film can be avoided.

Below, the case when the count switch is normal will be explained. In this case, with the first stroke of the release button, the switch SW1 is closed in such a manner that the respective circuits are supplied with current. Then, with the second stroke of the release button, the switch SW2 is closed so as to induce the differentiating circuit A1 to produce a differentiation pulse to be transmitted to the set terminal S of the flip-flop FF through the NOR gate NOR so as to set the flip-flop FF. Namely, in this case, the switch SW4 operates normally, namely, is closed until the leading shutter curtain has started to run so that a low level signal from the switch SW4 is applied to the NOR gate NOR. Thus, when the differentiating circuit A1 produces a low level pulse, the NOR gate NOR porduces a high level pulse so as to set the flip-flop FF. Consequently, in this case, the Q output terminal of the flip-flopFF delivers a high level signal, while the $\overline{Q}$ output terminal delivers a low level signal, whereby the transistor Tr1 is brought into the closed state in such a manner that the closed state of the current supply transistor Tr2 is maintained independently of the state of the switch SW1. With the second stroke of the release button RPB, the $\overline{Q}$ output terminal of the flip-flop FF delivers a low level signal so that the transistor Tr3 is brought into the opened state, while the input level at the positive input terminal of the comparator CP1 becomes almost the same as that of the power source voltage. Thus, the comparator CP1 immediately produces a high level signal with the second stroke of the release button so as to bring the transistor Tr9 into the closed state, and discharge the charge in the condenser C2 through the magent MG1 so as to excite the magnet MG1 in order to carry out the release operation of the camera. On the other hand, the light measuring circuit B is ready for operation with the first stroke of the release button, producing an output signal corresponding to the object brightness, which output signal is calculated with the exposure information signal from the exposure information signal forming circuit E by means of the calculation circuit H so as to produce a shutter time value signal (Tv signal). Thus, when upward mirror motion has been carried out along with the release operation of camera, the shutter time value signal is stored in the memory circuit G and then the leading shutter curtain starts to run so as to start the exposure to the film. When in this way the leading shutter curtain has started to run, the switch SW4 is opened in operative engagement with the start of the leading shutter curtain so as to bring the transistor Tr4 in the opened state and starts to charge the condenser C3. Namely, the transistor Tr10 logarithmically enlarges the Tv signal stored in the memory circuit G, in such a manner that the collector current corresponds to the enlarged Tv signal, so that when the transistor Tr4 has been brought into the opened state the condenser C3 is charged with the collector current. Consequently, the potential at the negative input terminal of the comparator CP2 gradually increases until the comparator CP2 is inverted after a certain time corresponding to the shutter time value stored in the memory circuit G, so as to bring the transistor Tr11 into the opened state. When the transistor Tr11 is brought into the opened state, the magnet MG2 is brought into the non-excited state so as to release the holding the trailing shutter curtain, allowing the trailing shutter curtain to run, completing the exposure and the automatic photographing. At the beginning of release operation, the count switch SW4 is closed so that the misoperation display LED does not light up. Further, when the release button has been pushed down to the second stroke, the level at the $\overline{Q}$ output terminal of flip-flop FF is low, so that the LED does not light up.

As mentioned above, in the erroneous operation preventing circuit in accordance with the present invention, when the count switch has been opened due to some failure such as broken wiring, before the movement of the leading shutter curtain, the actuation of the photographing operation is prohibited, while only when the count switch is normal the photographing operation can be carried out, so that it is remarkably effective as a safety device for a camera.

So far the operation is explained in accordance with the auto-photographing mode, whereby it goes without saying that the misoperation can be avoided in the same way in the self-timer photographing mode, the flash light photographing mode or bulb photographing mode.

What is claimed is:

1. A safety device for a camera having a count switch to be switched over out of a first state into a second state with shutter release operation and a timing circuit for starting clock operation when the count switch has assumed the second state comprising:
    means (NOR) for detecting the state of the count switch so as to prevent the release operation when the count switch has assumed the second state before the release operation is initiated.

2. A safety device according to claim 1, wherein the preventive means consists of a gate circuit having an input terminal to be connected to the count switch.

3. A safety device according to claim 2, wherein the gate curcuit consists of a NOR gate.

4. A safety device according to claim 1, further comprising:
    (a) display means (LED) to be brought into a first operation state when it has been triggered; and
    (b) means (NOR) for detecting the state of the count switch so as to trigger the display means when the count switch has assumed the second state before the release operation of camera is initiated.

5. A safety device according to claim 4, wherein the trigger means consists of a gate circuit having an input connected to the count switch.

6. A safety device according to claim 5, wherein the gate circuit of the trigger means is an OR gate.

7. A safety device according to claim 4, further comprising:
    means (FF, NAND2) for bringing the display means into a non-excited state in response to the release operation of camera.

8. A safety device according to claim 4, further comprising:
- means (FF, NAND2) for disabling the display means at the time of exposure control of the camera.

9. A camera comprising:
- (a) timing means (N, C3) for determining exposure time;
- (b) a count switch connected to the timing means for controlling the operation of the timing means, said count switch assuming a first state for enabling the operation of the timing means and a second state for disabling the operation;
- (c) first means (FF) for enabling shutter release operation of the camera;
- (d) a release button (RPB);
- (e) trigger means (A1) for producing an electrical signal in response to the operation of the release button, so as to energize the first means (FF); and
- (f) means (NOR) for detecting the state of the count switch so as to override said electrical signal when the count switch has assumed the second state before the release operation of the camera is carried out.

10. A camera according to claim 9, wherein the trigger means consists of a differentiating circuit associated with the release button for producing a trigger pulse.

11. A camera according to claim 10, wherein the overriding means consists of a gate means connected to the output terminal of the differentiating circuit and the count switch so as to apply the second state of said count switch to disable the first means preferentially.

12. A camera according to claim 11, wherein the gate means of the overriding means consists of a NOR gate.

* * * * *

UNITED STATES PATENT OFFICE
CERTIFICATE OF CORRECTION

Patent No. 4,236,802　　　　　　　　Dated Dec. 2, 1980

Inventor(s) Masanori Uchidoi, et al

It is certified that error appears in the above-identified patent and that said Letters Patent are hereby corrected as shown below:

Claim 1, line 6, delete "(NOR)".

Claim 4, line 3, delete "(LED)";
　　　　　line 5, delete "(NOR)".

Claim 7　line 3, delete "(FF,NAND2)".

Claim 8, line 3, delete "(FF,NAND2)".

Claim 9, line 2, delete "(N,C3)";
　　　　　line 9, delete "(FF)";
　　　　　line 11, delete "(RPB)";
　　　　　line 12, delete "(A1)";
　　　　　line 14, delete "(FF)";
　　　　　line 15, delete "(NOR)".

Signed and Sealed this

Seventh Day of September 1982

[SEAL]

Attest:

GERALD J. MOSSINGHOFF

*Attesting Officer*　　*Commissioner of Patents and Trademarks*